United States Patent [19]

Bux et al.

[11] Patent Number: 4,583,088
[45] Date of Patent: Apr. 15, 1986

[54] METHOD AND APPARATUS FOR CONTROLLING ACCESS TO A COMMUNICATION NETWORK

[75] Inventors: Werner K. Bux, Richterswil; Ernst H. Rothauser, Reichenburg, both of Sweden

[73] Assignee: International Business Machines Corp., Armonk, N.Y.

[21] Appl. No.: 497,534

[22] Filed: May 24, 1983

[30] Foreign Application Priority Data

Jun. 15, 1982 [EP] European Pat. Off. ........ 82105211.5

[51] Int. Cl.$^4$ .......................... H04J 3/02; H04Q 9/00
[52] U.S. Cl. ............................ 340/825.5; 340/825.02; 340/825.05; 370/85; 370/86; 370/93
[58] Field of Search ..................... 340/825.05, 825.07, 340/825.5, 825.51, 825.52, 825.02; 370/85, 93, 86, 89, 77; 375/36; 364/200

[56] References Cited

U.S. PATENT DOCUMENTS

| | | | |
|---|---|---|---|
| 3,846,587 | 11/1974 | Schenkel | 370/86 |
| 4,063,220 | 12/1977 | Metcalfe et al. | 340/825.5 |
| 4,096,335 | 6/1978 | Rothauser | 370/93 |
| 4,161,786 | 7/1979 | Hopkins et al. | 370/85 |
| 4,347,498 | 8/1982 | Lee et al. | 340/825.02 |
| 4,439,856 | 3/1984 | Ulug | 340/825.5 |
| 4,472,712 | 9/1984 | Ault et al. | 340/825.5 |
| 4,495,493 | 1/1985 | Segarra et al. | 340/825.5 |

OTHER PUBLICATIONS

Julioburger, H. Y. and D. Wortzmann, "Multi-Peer Access Loop Communication System", *IBM Technical Disclosure Bulletin*, vol. 22, No. 10, pp. 4586–4590, Mar. 1980.

*Primary Examiner*—Donald J. Yusko
*Assistant Examiner*—Sharon L. Hodgkins
*Attorney, Agent, or Firm*—John B. Frisone

[57] ABSTRACT

A communication system comprises several transmission bus segments (A ... G) to which data stations (ST) are attached. Node units (1 ... 7) are provided for interconnecting the bus segments which are selectively activated in a predetermined sequence for authorizing message transmission by attached data stations according to any given access protocol. Thus, only small groups of stations contend for access, but all messages are distributed over the whole network. Activation of a bus segment is effected by an authorization message from an assigned node unit. A token message is used to pass the status enabling a node to activate its assigned bus segment, sequentially through all nodes of the network. Each node unit comprises a control unit (17) for sending and receiving token messages and segment activation messages, and further comprises unidirectional amplifier means and switches (11) for establishing a connection between two associated bus segments selectively in either direction.

12 Claims, 7 Drawing Figures

FIG. 1 NETWORK CONFIGURATION
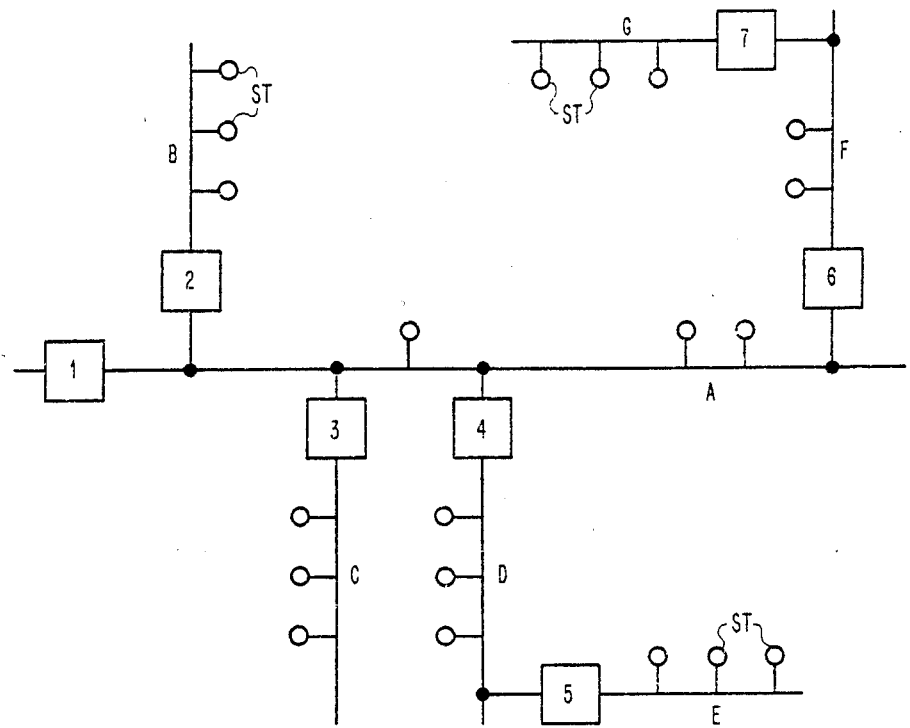
FIG. 2 NODE
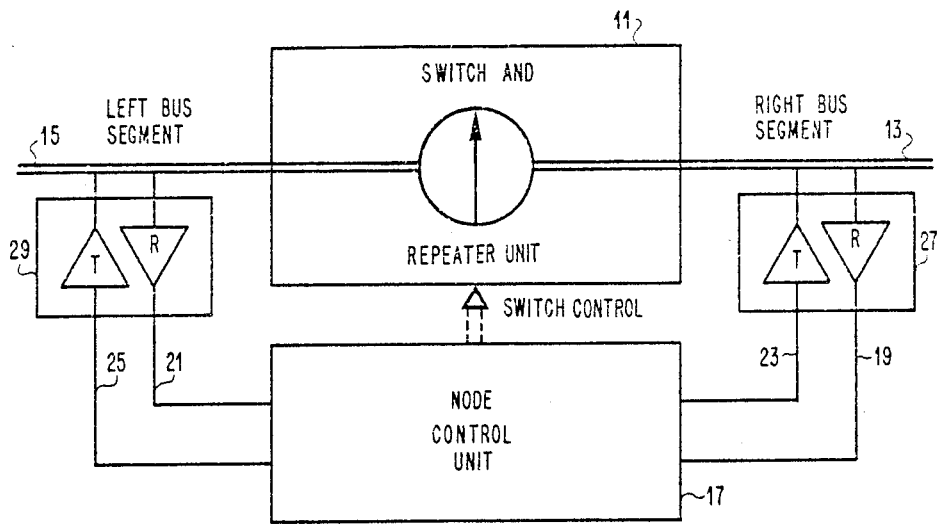

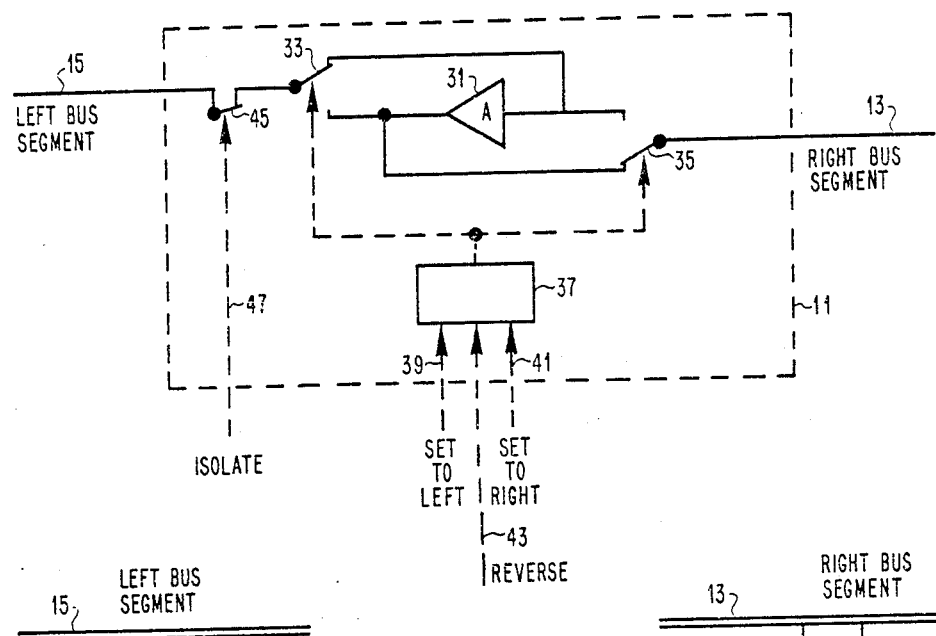
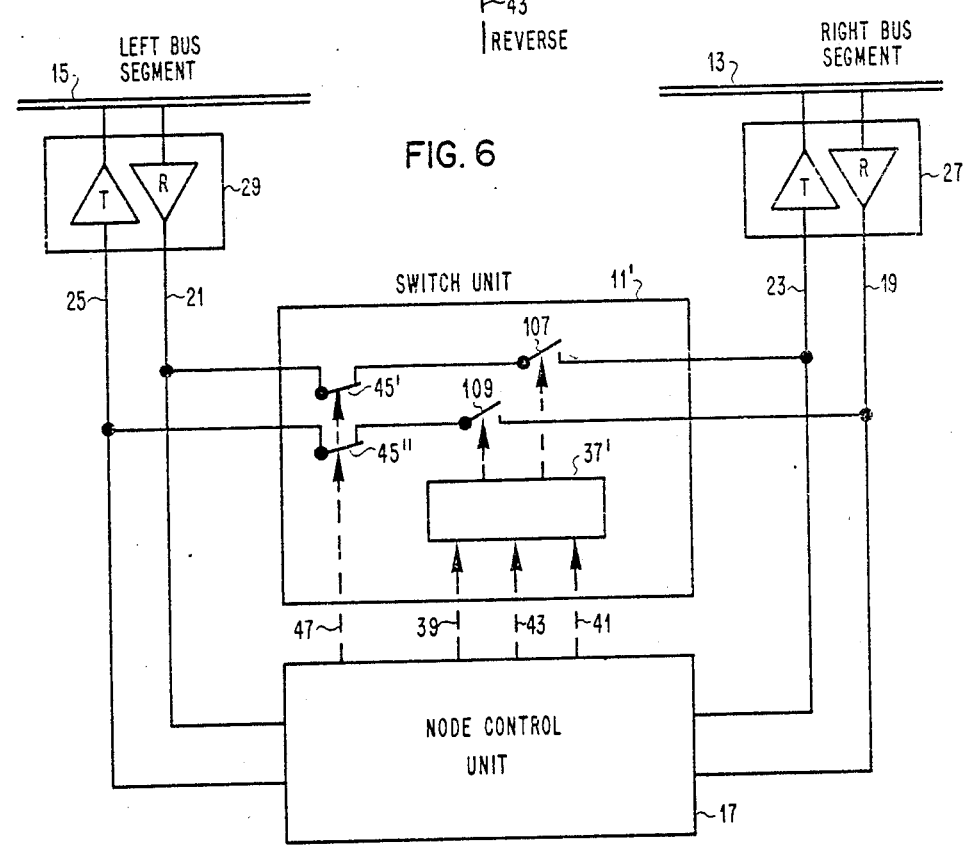

METHOD AND APPARATUS FOR CONTROLLING ACCESS TO A COMMUNICATION NETWORK

The present invention is concerned with a communication system comprising several interconnected bus segments to which stations are attached. Such networks are particularly suited for local area communication facilities which interconnect data stations located within a building or in a restricted area.

STATE OF THE ART

One such system is known from U.S. Pat. No. 4,063,220. Its bus segments are permanently interconnected by bidirectional repeaters, and all attached stations can communicate with each other. They contend for access to the bus segments, i.e. the transmission medium, in a specific procedure.

While the overhead for regulating bus access by stations is relatively low, problems may arise when the network grows. With a large number of stations, the probability of collisions of attempted accesses increases drastically, partly because of the larger number of attempting stations, partly because of the larger average distance or propagation delay between colliding stations. Furthermore, due to the hybrid circuits or bidirectional repeater units, the number of repeaters which can be interconnected in sequence, and thus the number of bus segments allowed in a linear arrangement is restricted to avoid instabilities and to keep the end-to-end delay small.

In the system disclosed in "Multi-Peer Access Loop Communication System" by H.Y. Juliusburger and D. Wortzmann, published in the IBM Technical Disclosure Bulletin, Vol. 22, No. 10, pp. 4586–4590 (March 1980), stations are interconnected by a unidirectional ring transmission medium. Each primary station polls its associated secondaries sequentially, and when the polling message arrives at the next primary, the latter starts polling sequentially its associated stations. The technique disclosed is restricted to unidirectional closed loops and does not provide for independent data exchange between any two stations. Each message of a secondary must first be sent to a primary before it can be retransmitted to another secondary.

OBJECTS OF INVENTION

It is an object of the invention to devise a multiple bus segment communication system with bus access contention for peertype message interchange between all stations which has a lower collision probability than known systems of this type. It is a further object to provide such a system in which a larger number of bus segments can be interconnected, and in which the number of segments that can be interconnected in sequence is not restricted. A further object of the invention is a multiple bus segment communication system in which the interconnecting node units need only unidirectional repeaters and do not require hybrid or 2-to-4 wire conversion sections.

The method and system by which these objects can be achieved are defined in claims 1 and 2, with particularly advantageous features being defined in the dependent claims.

The advantages of the disclosed method and system are that despite the fact that no central control is required and each station gets regularly a chance for access to the medium and then can directly communicate with all other stations of the system, only small groups of stations which are located close to each other contend, so that the probability of collisions is reduced. Because of the possibility of using unidirectional amplifiers with controlled reversal of their transfer direction by associated switches, a higher electrical stability is achieved allowing for more bus segments and node units to be interconnected.

LIST OF DRAWINGS

An embodiment of the invention will be described in the following in connection with drawings.

The drawings show the following:

FIG. 1—Configuration of the network chosen as embodiment;

FIG. 2—Basic block diagram of a node unit for interconnecting bus segments;

FIG. 3—Details of the switch and repeater unit of the node unit of FIG. 2;

FIGS. 4A & 4B—Details of the node control unit of the node shown in FIG. 2;

FIG. 5—Flow diagram of the operation of a node unit according to FIGS. 3 and 4;

FIG. 6—An alternative embodiment for the switch and repeater unit of a node unit

DETAILED DESCRIPTION OF AN EMBODIMENT

Figure 4A:
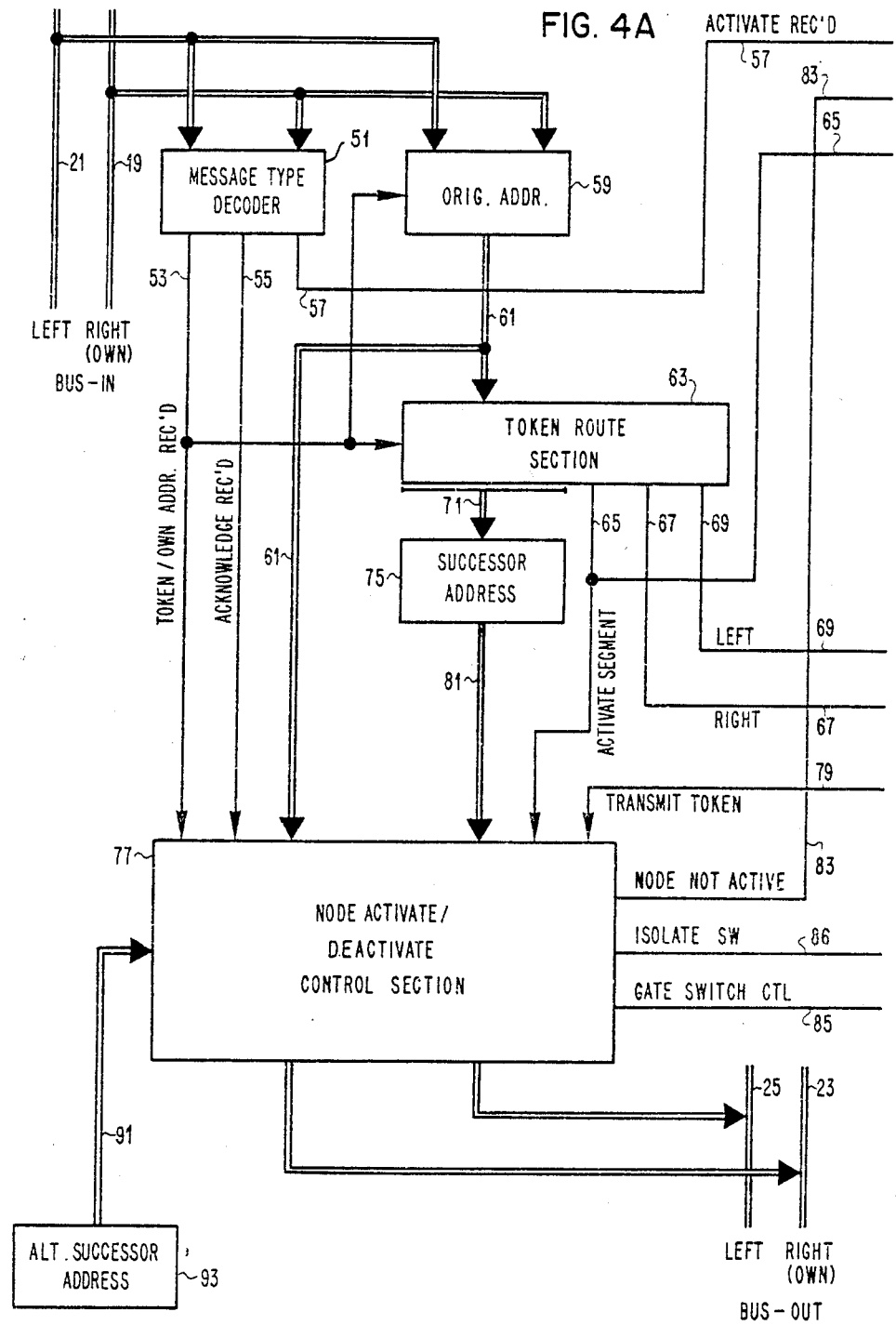

Network Configuration:

FIG. 1 shows the configuration of a local network in which the invention finds application. It comprises a plurality of bus segments A, B, C, D, E, F, G which are interconnected by node units 1, 2, 3, 4, 5, 6, 7. A number of stations ST are connected to each bus segment.

The stations are considered to be peer-type units, i.e. they use the network consisting of bus segments and nodes only as a transport medium, but each can independently send messages to, or establish connections with, other stations (obeying, of course, a given access protocol such as CSMA). Each bus segment is a bidirectional communication line, e.g. a coaxial cable, comprising outlets or taps at which stations or node units can be attached. Each node unit comprises unidirectional amplifier means (repeater/regenerator) and switches for selectively connecting the amplifier means so that it either transfers messages from a first to a second bus segment attached to the node, or vice versa from the second to the first bus segment. In the following description, the two bus segments attached to a node unit will be called the "right bus segment" and the "left bus segment," respectively.

Principle of Invention:

The basic idea of the invention is that in the whole network, only one node unit and one bus segment are "active" at a time. The active node (e.g. node 3) sends a message to all stations at the bus segment which is to be activated (e.g. segment C). This activation message allows them to contend for network access. Amplifiers in all nodes are switched in such a way that messages transmitted from stations attached to the presently active segment can propagate to all stations in the network.

The activity status is passed in a predetermined sequence from node to node by a token message. When at a presently active segment the bus is silent, or a given maximum time has elapsed, the assigned node unit (e.g. node 3) sends a token message to its successor node (e.g. node 4) which then becomes the active node whereas the token sender (after deactivating its bus segment) is deactivated. The newly activated node (i.e. node 4) will then activate its assigned bus segment (e.g. segment D) for access contention by its stations.

When the token is forwarded from one node to another, setting of the repeater switches in the nodes involved is updated so that always the messages originating at the currently active bus segment can pass through the network to all stations at all other bus segments.

In this way, all nodes and thus all bus segments are activated in sequence so that each station gets a chance to transmit a message.

After such an activation sequence for the whole network, the token is passed back to the first node unit to start the next sequence.

Advantages of this method and arrangement are twofold: (1) improved performance and flexibility, especially if a random access scheme such as CSMA is used as the basic access mechanism, and (2) avoidance of the difficulties in building and tuning bidirectional repeaters.

The reasons for improved performance and flexibility are: (a) Contending groups are much smaller than the whole population of stations. (b) Maximum propagation delay between contending stations is limited to one segment length instead of the length between most remote stations of the whole network. (c) Repeater delays (which significantly contribute to the end-to-end delay in known systems) do not add to the end-to-end delay between contending stations. Therefore, a much greater number of repeaters can be connected in sequence (i.e. networks can have more nodes and segments).

Network Principles:

To simplify understanding, some restrictions are made for the present embodiment and are listed here:

Each node unit can be connected either to one or to two bus segments

Each node is assigned to one bus segment (and vice versa) for activating/deactivating the segment All nodes are of equal design Each segment is connected at least to one node (its assigned activation node); any number of further nodes may be connected to a segment (as branching points for further segments)

The token can be passed from one node only to another node which is connected to the same segment, i.e. a token can never pass a node without activating it If a token has to be passed twice through a node during one activation sequence (forward path and return path), the respective node activates its associated segment only once A node has at least one predecessor and one successor node, it may have two predecessor and two successor nodes (if the token must pass through it twice during each sequence)

If a node (plus its associated segment) is inserted into or removed from the network, its neighbor nodes (i.e. predecessors and successors) must be notified of their new successor or predecessor nodes, respectively.

Network Operation Messages:

The following messages are provided for operating the present network embodying the invention:

TOKEN Message: It includes a destination address and an origin address and serves for passing the token from an origin node to a destination node ACKNOWLEDGE Message: It also includes a destination address and an origin address and serves for acknowledging that one node has received and accepted the token from another node ACTIVATE Message: It is directed from an active node to data stations; a station having received this message can contend for bus access DEACTIVATE Message: It is directed from any node to all stations; a station having received this message must stop to contend for bus access.

By special measures to be explained later it is guaranteed that only the stations of one bus segment are activated at a time, and that stations of all other bus segments are deactivated.

The assignments between node units and bus segments are rather straightforward in the present system shown in FIG. 1 but are listed in the following table for clarification.

TABLE 1

| Node Unit: | 1 | 2 | 3 | 4 | 5 | 6 | 7 |
|---|---|---|---|---|---|---|---|
| Assigned Bus Segment (for Activation): | A | B | C | D | E | F | G |

Node Unit:

The basic elements and connections of a node unit are shown in FIG. 2. A node comprises a switch and repeater unit 11 which can be set to either transfer messages from "right" bus segment 13 to "left" bus segment 15, or from the left to the right bus segment; but which can also be set to an isolate state interrupting any transfer between the two bus segments. A node further comprises a control unit 17 which can store token route information (successor, predecessor addresses etc.), which evaluates received information, which develops switch control signals and which can transmit TOKEN, ACKNOWLEDGE, ACTIVATE, and DEACTIVATE messages.

A node control unit is connected to both attached bus segments for receiving information on a right bus-in 19 and a left bus-in 21 and for transmitting information on a right bus-out 23 and a left bus-out 25. Right bus-in 19 and right bus-out 23 are connected to right bus segment 13 through a receiver R and a transmitter T in first connecting circuitry 27. Left bus-in 21 and left bus-out 25 are connected to left bus segment 15 through a receiver R and a transmitter T in second connecting circuitry 29.

More details of switch and repeater unit 11 and of node control unit 17 will be shown and explained in connection with FIGS. 3 and 4.

Switch and Repeater Unit:

FIG. 3 shows in a block diagram the main elements of switch and repeater unit 11 of a node. It comprises a unidirectional repeater or amplifier 31 which can be connected between right bus segment 13 and left bus segment 15 in either one of the two possible directions by simultaneously operated switches 33 and 35. Control signals for these switches are furnished by switch control 37 which contains a bistable circuit that in turn can be set, reset or reversed by three different control signals from the node control unit on lines 39, 41 and 43: "set to left"; "set to right"; and "reverse". It should be noted that a direct connection between switches 33 and 35 is never possible. They are always separated by amplifier 31.

An isolating switch 45 is also provided. It is controlled by an "isolate" signal on line 47 from the node control unit. By this switch 45, the right and left bus segment can be completely isolated from each other without changing the position of switches 33 and 35.

Figure 4B:
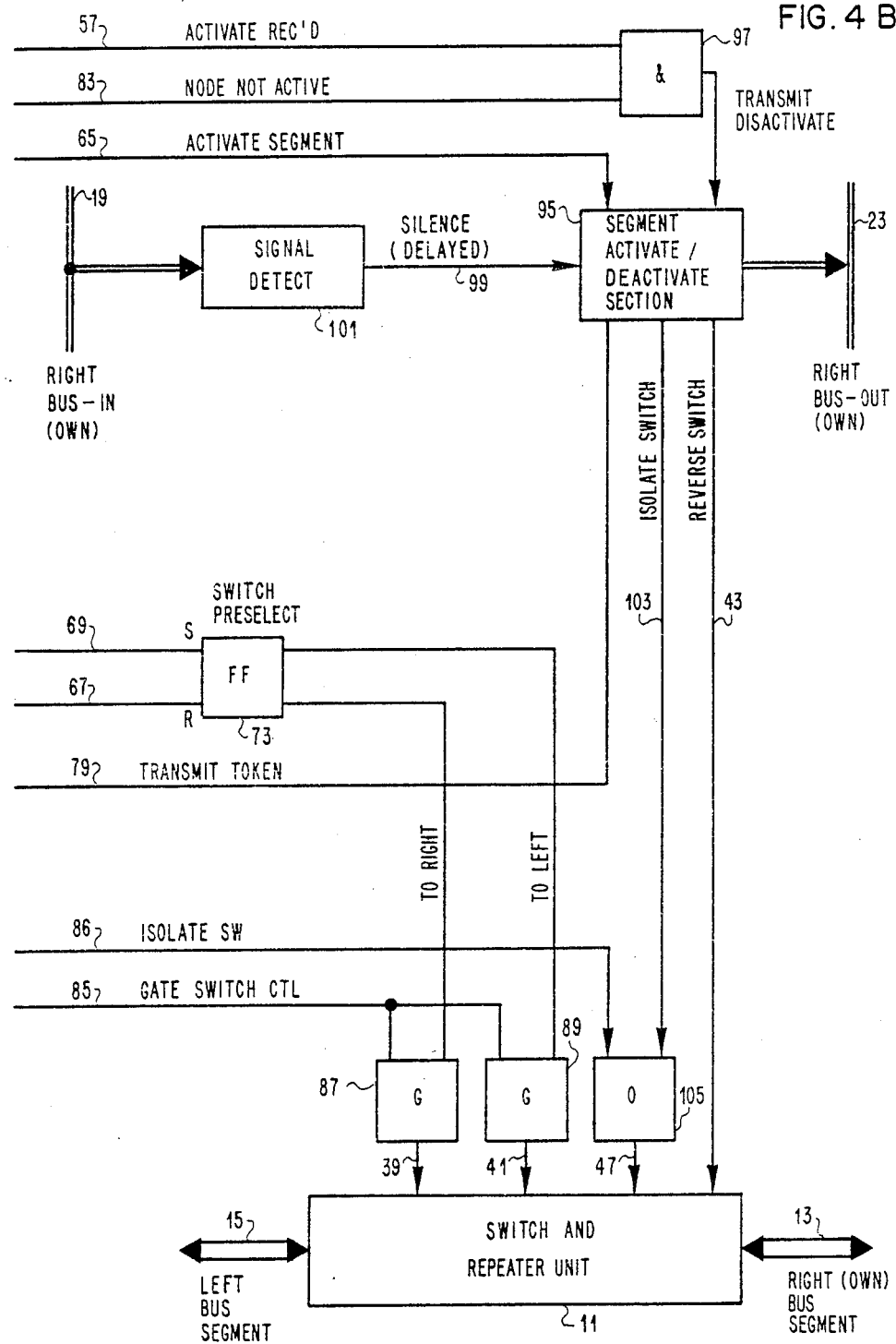

Node Control Unit:

FIG. 4 is a block diagram of the main elements of node control unit 17. Message type decoder 51 is connected to right bus-in lines 19 and also to left bus-in lines 21 to receive each message propagated on both bus segments which are connected to the respective node unit. It activates a control signal on line 53 when a TOKEN message was received having as destination address the node's own address. A control signal on line 55 is activated after reception of an ACKNOWLEDGE message from another node, and a control signal on line 57 is activated when an ACTIVATE message was received from another node.

The origin address of each message is stored in register 59 and will be available on lines 61 if the token/own address signal on line 53 is active.

Token route section 63 comprises two registers each having the following fields:

(a) Predecessor node address
(b) Activate segment bit
(c) Switch-right bit
(d) Switch-left bit
(e) Successor node address When the respective node receives a token from the predecessor identified in (a), the three bits in fields (b), (c) and (d) determine whether the bus segment assigned to the respective node must be activated, and when thereafter the token is forwarded to the successor node whose address is given in (e), how the switches have to be set (left or right) when the node is deactivated.

The registers are loaded when the respective node is inserted into the system, or when its neighbor nodes (predecessor or successor) are changed.

When the node received a token with its own address, the signal on line 53 will activate token route section 63 to use the token origin address on lines 61 to read out the register having this origin as predecessor address, and to furnish the contents of fields (b), (c), (d) and (e) on lines 65, 67, 69 and 71, respectively. The signals on lines 67 and 69 will either set or reset a switch preselect flip-flop 73. The address on lines 71 is loaded into successor address register 75.

Block 77 is the node activate/deactivate control section. It receives the "token/own address received" signal on line 53, the "acknowledgment received" signal on line 55, the "activate segment received" signal on line 65, and a "transmit token" signal on line 79. Its further inputs are the origin address lines 61 and the successor address lines 81. Its data output lines are connected to right bus-out 23 as well as to left bus-out 25. Control output lines are a line 83 for an indicator signal "node not active", a line 85 for a control signal "gate switch control", and a line 86 for a control signal "isolate switch".

Functions of node activate/deactivate control section 77 are as follows: When the token/own address indicator signal (line 53) becomes active, the "node not active" signal on line 83 is deactivated; and an ACKNOWLEDGE message, using as destination address the origin address on lines 61, is furnished to the bus-out lines (23 and 25). Simultaneously, the signal "isolate switch" on line 86 is raised. If, thereafter, the "activate segment" signal on line 65 is not raised within a given time, or if the signal "transmit token" on line 79 is activated, a TOKEN message using as destination address the successor address on lines 81 will be furnished to the bus-out lines (23 and 25). During token message transmission, the "isolate switch" signal on line 86 is raised again. If, thereafter, the "acknowledgment received" signal is raised on line 55, the "gate switch control" signal is activated on line 85 to operate gates 87 and 89 for the switch control signals. Simultaneously, the signal "node not active" on line 83 is raised again.

The token message will be repeated several times (e.g. three times) if no acknowledgment is received within a given time limit; and thereafter, an alternate successor address on line 91 which was previously loaded into register 93 may be used as the token address. Alternatively, an appropriate error message may be transmitted to a network service center without issuing a token.

Block 95 is a segment activate/deactivate section. It receives the "activate segment" signal on line 65, and a "transmit deactivate" signal from an AND gate 97 (if an ACTIVATE message is received when the respective node is not active). It further receives a delayed "silence" signal on line 99 from a signal detector 101 which is connected to the own (assigned) bus segment 13 via right bus-in lines 19. The main output of this section is connected to right bus-out 23 for furnishing messages to the own (right) bus segment 13. It has further output lines 43, 103 and 79 for control signals "reverse switch", "isolate switch", and "transmit token", respectively.

Functions of segment activate/deactivate section 95 are as follows: When the signal "activate segment" on line 65 is raised, an ACTIVATE message is released on the right bus-out 23 for the own (right) bus segment 13. The "reverse switch" signal is then raised on line 43. If any time thereafter silence is indicated on line 99, or if the "transmit deactivate" signal is raised on the output line of AND gate 97, a DEACTIVATE message is released on the right busout 23 for the own (right) bus segment 13.

The ACTIVATE message enables all stations which receive it to contend for access to the bus segment to which they are attached. The DEACTIVATE message deables all stations receiving it.

After transmission of a DEACTIVATE message which was previously preceded by an "activate segment" pulse (not one which was caused by a control pulse from AND gate 97), the signal "transmit token" is raised on line 79 to the node activate/deactivate control section 77.

The switch and repeater unit 11 and the control and transmission lines connected to it are the same as those shown in FIG. 2. The "isolate" signal on line 47 is furnished by an OR gate 105 which has its inputs connected to "isolate switch" lines 86 and 103.

Figure 5:
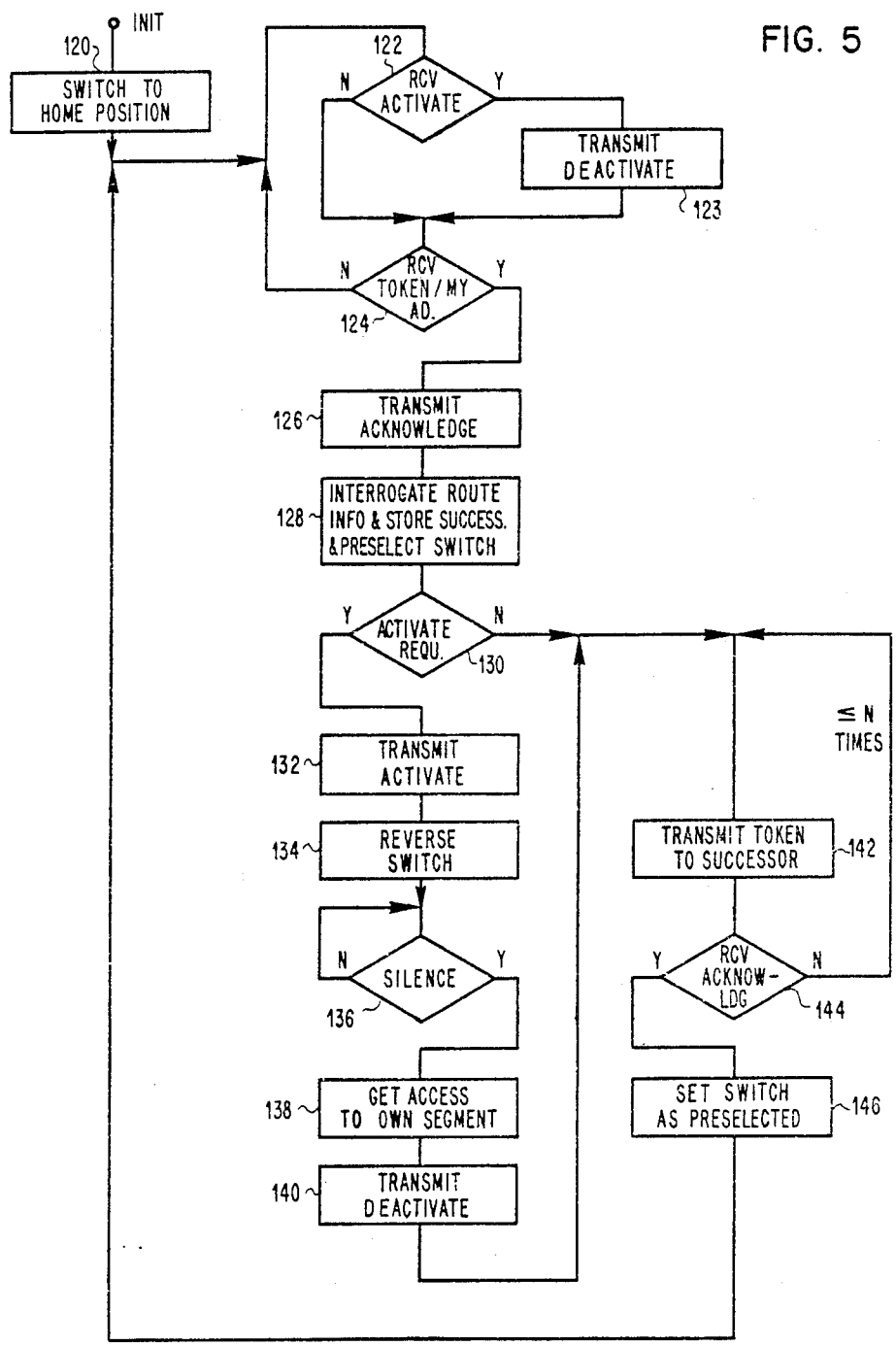

Operation of Node Unit:

The operation of a node will now be explained in connection with the flow diagram of FIG. 5; and with reference to FIG. 4.

In a first step (120) when operation is started, each node is initialized and the switches set to a home position, e.g. the position transferring messages towards its own; assigned bus segment (by definition, this segment is called the right bus segment and the respective switch position the right position). This ensures that all messages properly propagate through the whole network after initialization.

Then, each node watches whether it receives an ACTIVATE message (block 122) or a TOKEN message with its own address (block 124). Respective indicator signals will be furnished by message type decoder 51 (FIG. 4). If an ACTIVATE message is received but the node is not active, the node will immediately isolate its repeater and send a DEACTIVATE message to its own segment (block 123). This is done by segment activate/deactivate section 95 in response to a "transmit deactivate" signal from AND gate 97 (FIG. 4). The purpose of this operation is to ensure that an ACTIVATE message distributed by an active node does not result in the activation of bus segments assigned to other, currently inactive nodes; thus, only the own assigned bus segment of the active node is finally activated. The switches in inactive nodes are temporarily inhibited to avoid back-distribution of the DEACTIVATE message to the segment that actually should be activated.

When a node receives a TOKEN message with its own address as destination (block 124), it immediately transmits an ACKNOWLEDGE message (block 126) addressed to the origin of the received token. This is done by node activate/deactivate control section 77, using the address in register 59. Thereafter, the origin address in register 59 is used to interrogate the token route information (block 128) for determining the successor address (next node to receive token), for preselecting the new switch setting, and for determining whether the bus segment assigned to the node is to be activated this time or not. All this information is obtained from a register in token route section 63. The successor address will be stored in register 75, the switch preselect information in flip-flop 73.

If the node must activate its assigned bus segment, it transmits an ACTIVATE message (block 132) to allow all stations connected to its bus segment to contend for bus access, and then reverses the setting of its switches, i.e. the transfer direction of its repeater (block 134) so that any message transmitted by any station on its bus segment can propagate to all bus segments on both sides of the active nodes; i.e. to all other parts of the network. As was mentioned above, all other nodes, i.e. the inactive nodes, will destroy the effects of the ACTIVATE message for their own bus segment by immediately sending a DEACTIVATE message (block 123).

After transmitting the ACTIVATE message, the active node will watch its assigned bus segment for silence to occur for a given period of time, to determine when no station sends a message any more (block 136). In the meantime, all stations of the active bus segment had a chance to transmit, the access being regulated by any one of several known multiple-access techniques, e.g. CSMA/CD.

The silence watch is done by signal detector 101 which reports the bus signal status to segment activate/deactivate section 95. Its "silence" output signal on line 99 is only raised when there was no signal on the bus segment for a given period of time. In response to silence the active node gets access to its bus segment (block 138) and transmits a DEACTIVATE message on this bus segment (block 140) which will then be propagated over the whole network to prepare forwarding of the token and changing of the node and bus segment active status.

In a node that received the token with own address but must not activate its assigned bus segment (because the token is on its return path and the bus segment was activated already once during that token cycle), all operations shown in blocks 132 through 140 are omitted; and the operation procedure directly goes on from block 130 to block 142.

When an active node deactivated the stations on its bus segment (or if it did not activate them at all), it transmits a TOKEN message to its successor node (block 142). This may be repeated a given number of times, e.g. three times if no acknowledgement is received (block 144) within a fixed time limit. The TOKEN message may finally be sent to an alternate successor if the regular successor node does not react at all (or an error message may be sent to a network service center). If, however, an ACKNOWLEDGE message is received from the successor, the node having forwarded the token will adjust the setting of its repeater switches (block 146) as indicated by the switch preselect flip-flop so that subsequently any messages transmitted on the next activated bus segment will be correctly propagated through the whole network. The node is then deactivated, i.e. it returns to block 122/block 124 to watch for the arrival of an ACTIVATE or TOKEN message.

Sending of the DEACTIVATE message is effected by the segment activate/deactivate section 95 when the "silence" signal on line 99 is raised. Section 95 then also raises the "transmit token" signal on line 79 to node activate/deactivate control section 77 which handles the sending of a TOKEN message with a successor address taken from register 75 or, alternatively, from register 93. Control section 77 also effects the repetition of the token message until it receives an "acknowledge" indication. Thereafter, it raises the "gate switch control" signal on line 85 to have the switch preselect information from flip-flop 73 be gated to the switch and repeater unit 11 for final setting of the switches as dictated by the information in token route section 63.

If no "activate segment" indication is received from line 65 by token activate/deactivate control section 77, it will (a fixed time after node activation) automatically initiate the token transmit procedure (which is otherwise initiated by the "token transmit" signal on line 79).

Token Route:

The route of the token in the present embodiment of FIG. 1, i.e. one complete cycle of the token through all nodes of the network, is given in Table 2 below.

TABLE 2

TOKEN ROUTE

| From Node | To Node | Segment Activated After Token Transfer |
|---|---|---|
| Initialization | 1 | A |
| 1 | 2 | B |
| 2 | 3 | C |
| 3 | 4 | D |
| 4 | 5 | E |
| 5 | 4 | — |
| 4 | 6 | F |
| 6 | 7 | G |
| 7 | 6 | — |
| 6 | 1 | A |

When system operation is started, node 1 is initialized to be active. It then activates its assigned bus segment A for station contention. Thereafter, a regular cycle starts: The token is transferred to node 2 which activates its assigned bus segment B. This goes on as indicated in the table until node 5 is active and has activated bus segment E. The next bus segment to be activated is segment F, thus the token should be sent to node 6. However, as can be seen from FIG. 1, the token must pass through node 4 again on its way to node 6. Thus, node 4 is shortly activated, but only for forwarding the token and for adjusting its repeater switches, and not for activating its bus segment D this time. The switch adjustment is necessary because when the token was with node 5, switches of node 4 had to insure message transfers from segment D to A; whereas afterwards, when the token is with node 6, switches of node 4 have to direct messages from section A to section D.

Node 4 now passes the token over to node 6 which will activate segment F, and the token then proceeds to node 7 for activating segment G. Thereafter, the token needs only to be routed back to node 1 through node 6 which is shortly activated without activating its assigned bus segment F this time.

When the token was accepted by node 1, the whole cycle which is shown between dashed lines in table 1 starts again. It is preferable to route the token so that each bus segment is activated once and only once during the token cycle, and that switch settings in nodes can always be updated to ensure message transmission from a currently active segment to all other parts of the network despite unidirectional repeaters in the nodes.

Successor Assignments:

The successor (and predecessor) assignments between nodes for obtaining the desired token route of Table 2 are shown in the following Table 3.

TABLE 3

| | SUCCESSOR ASSIGNMENTS | | | | |
|---|---|---|---|---|---|
| | | Activate | Switch to | | |
| Node | Predecessor | Segment | R | L | Successor |
| 1 | N 6 | + | 1 | 0 | N 2 |
| 2 | N 1 | + | 1 | 0 | N 3 |
| 3 | N 2 | + | 1 | 0 | N 4 |
| 4 | N 3 | + | 0 | 1 | N 5 |
| | N 5 | | 1 | 0 | N 6 |
| 5 | N 4 | + | 1 | 0 | N 4 |
| 6 | N 4 | + | 0 | 1 | N 7 |
| | N 7 | | 1 | 0 | N 1 |
| 7 | N 6 | + | 1 | 0 | N 6 |

The information shown in Table 3 is the same as that which is stored in the registers of the token route section 63 (FIG. 4) of each respective node.

The predecessor is the node from which the respective node (indicated in the left-most column) receives a token, and the successor is the node to which it must forward the token afterwards. A plus or minus sign indicates whether the own assigned bus segment of the respective node must be activated or not. A "1" in the R column indicates that repeater switches must be set to the "right" direction (i.e. message transfers towards own bus segment) afterwards, and a "1" in L column indicates that repeater switches must forward messages to the "left" direction (i.e. away from own assigned bus segment) when the respective node is deactivated.

When comparing FIG. 1 and Tables 2 and 3, one can see that a node at an end segment is only activated once during a cycle and has only one predecessor and successor, whereas a node within the network receives the token twice during a cycle and has two predecessors and two successors.

Node Insertion or Removal:

New nodes may be inserted into the network at any segment or old nodes may be removed. This requires, of course, an updating of the token route and thus of the token route information, i.e. the successor) predecessor assignments, in the neighbor nodes of the inserted or removed node.

The only operation required for updating the token route is the reloading of registers in token route section 63 of the nodes involved (neighbor nodes) by network management at the time of insertion or removal of a node. It should be noted that insertion, removal, or moving of normal stations (ST in FIG. 1) is not to be confused with node insertion or removal, and is in no way restricted when the present invention is used in a system.

ALTERNATIVE FOR SWITCH AND REPEATER UNIT

An alternative solution for switch and repeater unit 11 of FIGS. 2 and 3 is shown in FIG. 6. As in FIG. 2, also in FIG. 6 node control unit 17 is connected through first and second connecting circuitry 27 and 29, respectively, to its right bus segment 13 and left bus segment 15. However, in contrast to switch and repeater unit 11 of FIGS. 2 and 3, the alternative solution of FIG. 6 comprises only a switch unit 11' which does not contain an amplifier or repeater but only a few switches and associated control circuitry. This switch unit 11' is connected parallel to node control unit 17 between right bus-in 19, right bus-out 23 and left bus-in 21; left bus-out 25.

Switch unit 11' comprises switch 107 for directly interconnecting left bus-in 21 and right bus-out 23, thus establishing a unidirectional, amplifying path from left bus segment 15 to right bus segment 13. Switch unit 11; further comprises switch 109 for directly interconnecting right bus-in 19 and left bus-out 25, thus establishing a unidirectional, amplifying path from right bus segment 13 to left bus segment 15. Only one of switches 107 and 109 is closed at any time, never both.

The switches are controlled by switch control signals "set to left" on line 39, "set to right" on line 41, and "reverse" on line 43; respectively, through switch control 37' (which may be a bistable circuit with control inputs for set, reset, and reverse).

Switches 45' and 45" are provided in series with switches 107 and 109, respectively, for completely isolating the right and left bus segment from each other. They are controlled by an "isolate" signal on line 47.

The control signals on lines 39, 41, 43, and 47 are all furnished by node control unit 17 in the same way as was explained in connection with FIGS. 2 and 3. Instead of providing two isolate switches 45' and 45", one could as well furnish the isolate signal from line 47 to switch control 37' and modify the latter (e.g. by two gates at its outputs) to break both switches 107 and 109 when the isolate control signal is active.

The arrangement of FIG. 6 provides the same functions as that of FIGS. 2 and 3. It can selectively establish an amplifying connection between bus segments 13 and 15 in either direction, or it can isolate both from each other.

OTHER ALTERNATIVES

Many further modifications are possible in the embodiment described above without departing from the inventive concept.

(a) Bus segment assignments: In the example, each bus segment is permanently assigned to one node for activation (and vice versa). It is also possible to have changing assignments. In a linear arrangement of segments and nodes, e.g., the active node having the token could always activate that segment over which the token is forwarded next, so that during the token path from one end to the other, each node would activate its "right" segment, whereas on the return way of the token along the linear arrangement, each token would activate its "left" segment. Thus, each segment would be activated twice during one token cycle. This alternative would just require some additional information in the token route section registers: Instead of only indicating whether the single assigned segment is to be activated or not, an identification must be available which one of the plural assigned segment is to be activated in the respective situation.

(b) Multiple bus segments attached to one node: Instead of attaching two segments in maximum to one node as required in the example, three or more could be attached in an alternative solution. An end node, e.g., could have a plurality of end segments attached to it in a star configuration. Such a node can either activate all its assigned segments at once, or it could activate them sequentially so that only one segment is active at any time. This solution would require only a minor modification in the node control unit and, if such multiple attachments exist in the interior of a branched network, a modification of the token route information.

(c) Time limitation for active status of a bus segment: Instead of just waiting for silence to be present for a given period of time on its activated bus segment before passing-on the token, which can take excessive time if the attached stations are very busy, the active node could force a termination of the active status of the bus. For this purpose, means must be available in each node unit for recognizing the end of a station message. An active node can then start a timeout when it activates its segment, and when the maximum time has elapsed, it can watch for the next station message's end and thereafter force its DEACTIVATE message on the bus. As no silence would occur on the bus, none of the stations could try to contend in this situation.

(d) Other access techniques: Instead of using a carrier sense multiple access technique on the currently active bus segment, one could as well employ another scheme such as the one disclosed in U.S. Pat. No. 4,096,355.

(e) Addressed ACTIVATE message: In the example, the ACTIVATE message has no address, or a general system address valid for all stations so that measures must be taken (i.e. sending a DEACTIVATE message in appropriate directions, as described above) to avoid activation of stations on any other bus segment than the one that is presently selected. As an alternative, the ACTIVATE message could be addressed to a subset of all stations, in particular to those stations attached to a selected bus segment. This requires, however, that these stations have a common address part as group address.

(f) Transmitters and receivers in connecting circuitry 27 and 29 (FIGS. 2 and 6) and repeater 31 in switch and repeater unit 11 (FIG. 3) could be simple amplifiers. It may be suitable, however, to provide for these unidirectional transfer units well-known circuitry which regenerates the shape and the timing of the pulses transferred.

We claim:

1. Method of controlling access to a communication network consisting of separate bidirectional transmission bus segments interconnected by node units, one or a plurality of data stations being connected to each bus segment, characterized by the following steps:

setting one selected node unit (1. . . 7) into an active node status, sending an authorization message from the active node unit for authorizing only data stations (ST) attached to a predetermined one of the bus segments connected to said active node unit, which said predetermined one segment then becomes the active bus segment, to contend for access, transferring by each node unit messages from authorized data stations of the active bus segment, received on the one connected bus segment, to other connected bus segments in a flow direction away from the active bus segment, and passing the active node status from the currently active node unit to a predetermined next node unit, and repeating the above steps until all node units and bus segments were activated in a predetermined sequence.

2. Method in accordance with claim 1, characterized in that the authorization message is a general activate message transmitted by the active node unit (e.g. 4) only to the bus segment (e.g. D) to be activated, and that any non-active node unit (e.g. 5), immediately after receiving the activate message, transmits a deactivate message to any attached bus segment (e.g. E) in a direction away from the presently active bus segment, to disable authorization for all data stations not connected to the presently active bus segment.

3. Method in accordance with claim 2, characterized in that an active node unit which has sent an activate message for authorizing data stations of a selected bus segment, transmits, when no more messages are to be sent by authorized stations, first a deactivate message disabling all of the data stations in the network, and thereafter a token message for passing the active node status to the next node in the predetermined activation sequence.

4. Method in accordance with claim 1, characterized in that in each node unit, information is stored identifying the nodes which are activated prior to, and subsequent to, the respective node in the predetermined activation sequence.

5. Method in accordance with claim 1 or 4, characterized in that the activity status is passed from one node unit to the next node unit in the predetermined activation sequence by an addressed token message.

6. Method in accordance with claim 5; characterized in that the token message is only passed between two node units (e.g. 4 and 5) which are connected to the same bus segment (e.g. D), each node unit (e.g. 4) through which the token has to pass more than once during one complete predetermined activation sequence, activates only once during each said activation sequence any bus segment (e.g. D) which is assigned to it for activation.

7. Communication system comprising a plurality of interconnected bidirectional transmission bus segments (A . . . G) to which data stations (ST) are attached characterized by distributed control means (17; FIG. 4) for authorizing all data stations of a selected bus segment to simultaneously access the bus to which they are connected by a given access procedure, and for selecting bus segments in a predetermined sequence for data station access authorization until all bus segments are served, and connection means (11; 11', 27, 29; FIG. 3; FIG. 6) including unidirectional transfer means (31; 27, 29) and switching means (33, 35, 37; 107, 109, 37') for interconnecting all bus segments in such a way that a message transmitted by any one data station connected to the presently selected bus segment can propagate to all data stations at all bus segments.

8. Communication system in accordance with claim 7, characterized in that said bus segments (A . . . G) are interconnected by node units (1 . . . 7), each said node unit including control means (17; FIG. 4) which can transmit control messages to, and receive control messages from, each bus segment connected to the respective node unit, and unidirectional transfer means (31, 27, 29) and switching means (33, 35, 37, 107, 109, 37') for enabling data transfer between a first and a second connected bus segment selectively in either direction.

9. Communication system in accordance with claim 8, characterized in that said unidirectional transfer means is a single regenerative amplifier (31) having an input and an output, and said switching means (33, 35, 37) selectively connect either the input of the amplifier to a first bus segment (13) and its output to a second bus segment (15) or vice versa.

10. Communication system in accordance with claim 8, characterized in that said unidirectional transfer means include a first receiver and transmitter (27) connecting the node unit to a first bus segment (13), and a second receiver and transmitter (29) connecting the node unit to a second bus segment (15), and that said switching means (107, 109, 37') include switches (107, 109) for establishing a connection either from the first bus segment (13) via the first receiver (R, 27) and the second transmitter (T, 29) to the second bus segment (15), or from the second bus segment (15) via the second receiver (R, 29) and the first transmitter (T, 27) to the first bus segment.

11. Communication system in accordance with claim 9, characterized in that said switching means include isolating means (45; 45', 45") for completely inhibiting signal transfer between a first (13) and a second (15) bus segment connected to the respective node unit.

12. Communication system in accordance with claim 9, characterized in that each of said node units (1. . . 7) includes storage means (63) for activation route information comprising at least one successor node address.

* * * * *